J. A. AYALA.
AUTOMOBILE HEADLIGHT.
APPLICATION FILED JUNE 6, 1921.
1,427,085.
Patented Aug. 29, 1922.
2 SHEETS—SHEET 1.
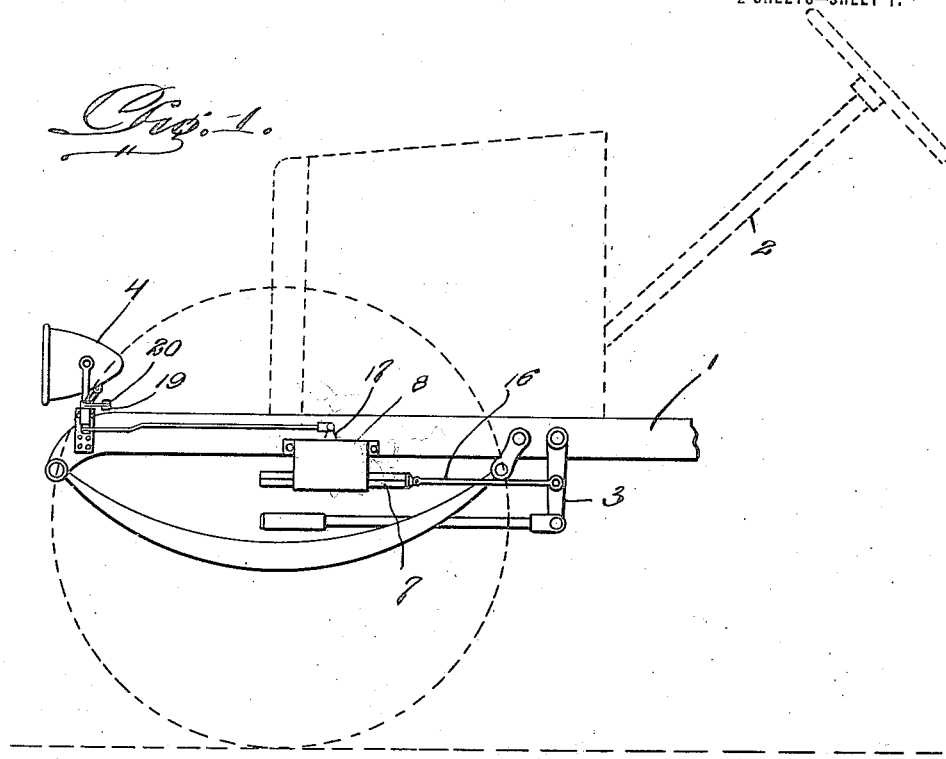
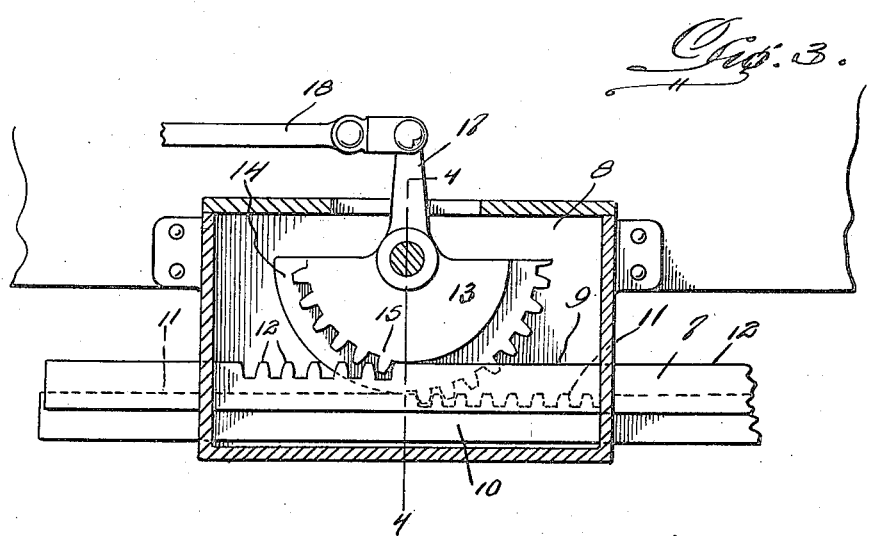
José Antonio Ayala,
INVENTOR
BY Victor J. Evans.
ATTORNEY
WITNESSES:

J. A. AYALA.
AUTOMOBILE HEADLIGHT.
APPLICATION-FILED JUNE 6, 1921.
1,427,085.
Patented Aug. 29, 1922.
2 SHEETS—SHEET 2.
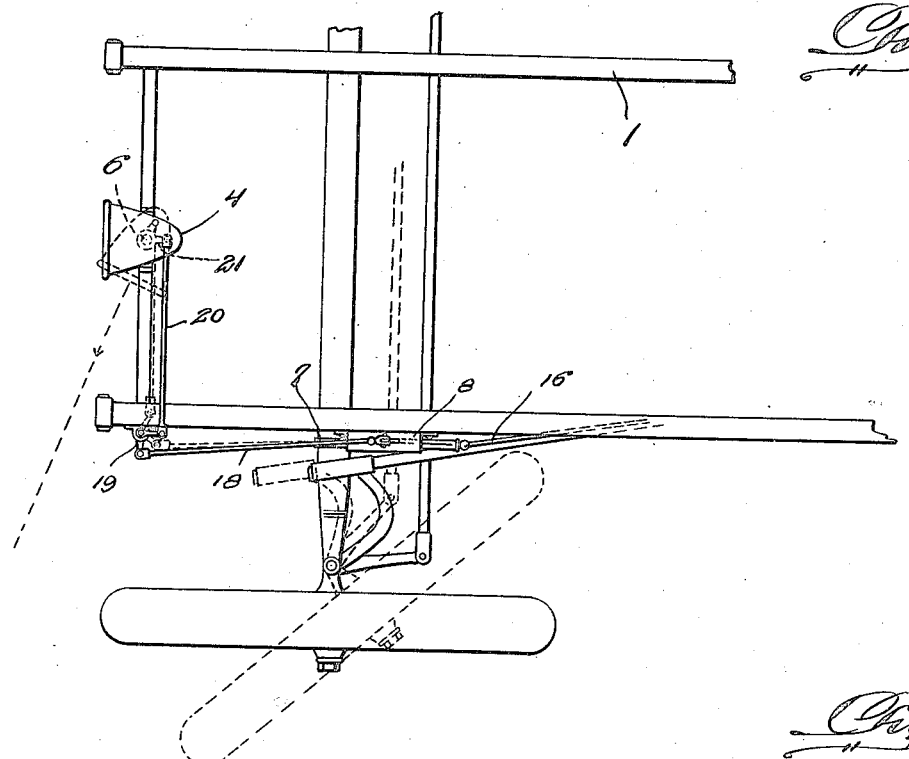
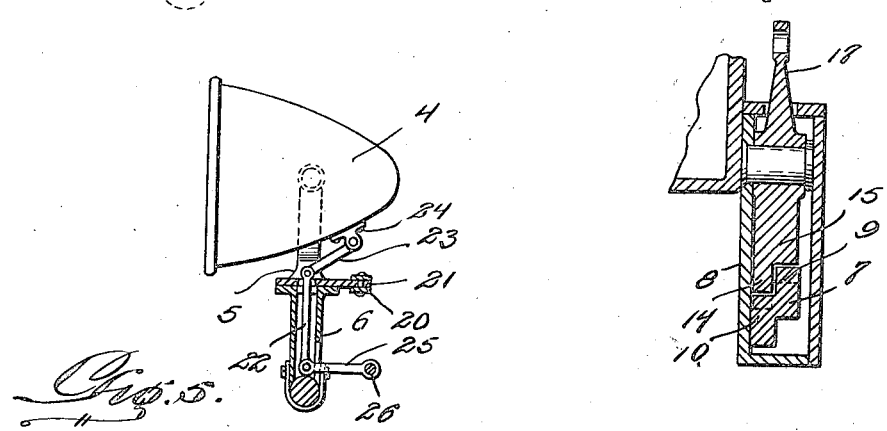

UNITED STATES PATENT OFFICE.

JOSÉ ANTONIO AYALA, OF CARACAS, VENEZUELA.

AUTOMOBILE HEADLIGHT.

1,427,085.　　　　Specification of Letters Patent.　　Patented Aug. 29, 1922.

Application filed June 6, 1921. Serial No. 475,367.

*To all whom it may concern:*

Be it known that I, JOSÉ ANTONIO AYALA, a citizen of Venezuela, residing at Caracas, Venezuela, have invented new and useful Improvements in Automobile Headlights, of which the following is a specification.

This invention relates to dirigible headlights for motor vehicles and the like, the general object of the invention being to provide means for automatically causing the rays of the light to follow the road on curves as well as on straight portions of the road.

Another object of the invention is to provide means whereby the lamp will be given a certain movement relative to the movement of the steering wheel when the vehicle is making a turn to the left and a different movement relative to said wheel when the vehicle is making a turn to the right, thus providing compensation means for the different movements of the front wheels when the vehicle is making left and right hand turns.

A further object of the invention is to provide means for tilting the lamp about a horizontal axis so that the rays of light may be made to strike the road different distances from the vehicle.

Figure 1 is an elevation, largely diagrammatic, showing my invention applied to an automobile.

Figure 2 is a diagrammatic plan view of the invention.

Figure 3 is an enlarged view of the segmental gear and a double rack bar.

Figure 4 is a section on line 4—4 of Figure 3.

Figure 5 is a detail view.

In these views 1 indicates a part of the chassis of an automobile, 2 the steering post and 3 the swinging arm which forms part of the steering mechanism of the automobile. The headlight 4 is centrally arranged at the front of the automobile and is pivotally supported between the forks of the upright post 5 which is rotatably supported on the standard 6, said standard being suitably secured to a part of the automobile.

A double rack bar 7 is slidably supported in a horizontal position in the bracket 8 which is supported from the frame. This bar is formed with an upper part 9 and a lower part 10, each part being provided with teeth 11 and flat portions 12. A segmental gear 13 is pivotally mounted to a part of the frame and this gear is provided with two peripheries, an outer one 14 and an inner one 15, each periphery has half of its surface toothed and the other half plain with the teeth on one periphery oppositely arranged with respect to the teeth on the other. One set of teeth is arranged to engage the teeth on part 9 of the rack bar, and the other set the teeth on part 10.

It will thus be seen that when the rack bar is moved towards the front of the automobile its teeth will engage the teeth of the outer periphery so as to move the segmental gear a certain distance and when the rack bar is moved in an opposite direction its upper row of teeth engaging the teeth on the inner periphery will move the segmental gear a greater distance. This rack bar is connected by link 16 with the arm 3 of the steering mechanism so that the rack bar will be reciprocated when the steering mechanism is actuated. The upwardly extending stem 17 of the segmental gear is connected by link 18 with a bell crank 19 pivoted to the front part of the frame and the other arm of this bell crank is connected by a link 20 with an arm 21 on the rotary post 5. Thus the reciprocating movement of the rack bar will be transmitted through the segmental gear and through connections with the rotary post to said post so that the lamp will be given a partial rotation about a vertical axis.

As before stated the different degrees of movement given the segmental gear by the rack bar will cause the lamp to swing in a greater arc in one direction than in the other and this will compensate for the swinging movements of the front wheels when the vehicle is turned to the right and left. This movement of the various parts will keep the rays of light in the center of the road in taking turns so that there is no danger of the driver becoming confused owing to one part of the road being better lighted than other parts.

I also provide means for tilting the lamp about its horizontal axis, such means consisting of a longtitudinally movable rod 22 mounted in the standard 6 and having its upper end connected by link 23 with a bracket 24 on the lower part of the lamp adjacent the rear thereof. The lower end of rod 22 is connected to an arm 25 which is carried by the rotary shaft 26, arm 25 passing through a slot or opening 27 in standarad 6. Any desired means may be provided for rocking the shaft 26 and this rocking movement will cause the lamp to tilt upon its horizontal axis through means of the rod 22 and the link 23, as will be understood.

This arrangement of parts will permit the lamp to be adjusted so that the rays of light will strike the road at the desired distance from the automobile.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with a motor vehicle and its steering mechanism, a centrally arranged headlight thereon, means for moving the same about a vertical axis when the steering mechanism is actuated, such means including means for compensating for the different degrees of movement of the front wheels turning towards the right and left.

2. In combination with an automobile and its steering mechanism, a centrally arranged headlight on the automobile, means for moving the headlight about a vertical axis when the steering mechanism is actuated, such means including means for compensating for the different degrees of movement of the front wheels in turning to the right and left and means for tilting the lamp about a horizontal axis.

3. In combination with an automobile and its steering mechanism, a centrally arranged headlight, a double rack bar, means for compensating the same by the movement of the steering mechanism, a segmental gear having toothed portions arranged in arcs of circles of different diameters, one toothed portion engaging one set of teeth on the rack bar and the other portion the other set and said toothed portions being oppositely arranged so that when one portion is engaging its rack the other portion is out of engagement with its rack and means for connecting said segmental gear with the lamp so that the movement of the gear will act to rotate the lamp about a vertical axis.

4. In combination with an automobile and its steering mechanism, a centrally arranged headlight, a double rack bar, means for reciprocating the same by the movement of the steering mechanism, a segmental gear having toothed portions arranged in arcs of circles of different diameters, one toothed portion engaging one set of teeth on the rack bar and the other portion the other set and said toothed portions being oppositely arranged so that when one portion is engaging its rack the other portion is out of engagement with its rack and means for connecting said segmental gear with the lamp so that the movement of the gear will act to rotate the lamp about a vertical axis, such means consisting of a bell crank, a link connecting the same with the segmental gear and a second gear connecting the bell crank with a part attached to the lamp.

5. In combination with an automobile and its steering mechanism, a centrally arranged lamp, a rotatable member supporting the same, a bell crank, a link connecting the bell crank with said rotatable member, a segmental gear, a link connecting the same with the bell crank, said segmental gear having toothed portions thereon arranged in arcs of circles of different diameters with one toothed portion oppositely arranged with respect to the other toothed portion, a double rack bar engaging said segmental gear and a link connecting said rack bar with the steering arm of the steering mechanism.

In testimony whereof I affix my signature.

JOSÉ ANTONIO AYALA.